US011953310B2

(12) United States Patent
Belda Pla et al.

(10) Patent No.: US 11,953,310 B2
(45) Date of Patent: Apr. 9, 2024

(54) METHOD FOR MEASURING GAP AND FLUSH OF VEHICLE PARTS AND MEASURING TUNNEL

(71) Applicant: EINES SYSTEMS, S.L.U., Almussafes (ES)

(72) Inventors: Jesús Belda Pla, Almussafes (ES); Jorge Broto Ruiz, Almussafes (ES); José Arribas Lozano, Almussafes (ES); María José Esteve Cubel, Almussafes (ES)

(73) Assignee: EINES SYSTEMS, S.L.U., Almussafes (ES)

( * ) Notice: Subject to any disclaimer, the term of this patent is extended or adjusted under 35 U.S.C. 154(b) by 246 days.

(21) Appl. No.: 17/764,333

(22) PCT Filed: Jul. 28, 2020

(86) PCT No.: PCT/ES2020/070488
§ 371 (c)(1),
(2) Date: Mar. 28, 2022

(87) PCT Pub. No.: WO2021/079018
PCT Pub. Date: Apr. 29, 2021

(65) Prior Publication Data
US 2022/0333914 A1    Oct. 20, 2022

(30) Foreign Application Priority Data
Oct. 23, 2019   (ES) ................. ES201930936

(51) Int. Cl.
*G01B 11/14*    (2006.01)
*G01B 11/00*    (2006.01)
(Continued)

(52) U.S. Cl.
CPC ............ *G01B 11/14* (2013.01); *G01B 11/002* (2013.01); *G06T 7/001* (2013.01); *G06T 7/13* (2017.01);
(Continued)

(58) Field of Classification Search
None
See application file for complete search history.

(56) References Cited

U.S. PATENT DOCUMENTS 5,313,695 A    5/1994   Negre et al.
6,529,283 B1   3/2003   Demopoulos et al.
(Continued)

FOREIGN PATENT DOCUMENTS

ES    2362262 T3      6/2011
GB    2375741 A       11/2002
WO    2012154878 A1   11/2012

*Primary Examiner* — Chikaodili E Anyikire
(74) *Attorney, Agent, or Firm* — The Webb Law Firm

(57) ABSTRACT

A method that is able to measure the gap and flush of vehicle parts by means of a measuring tunnel. The method is able to determine the coordinates in 3D of the edges or ends of two adjacent parts of a vehicle. The measuring tunnel includes several video cameras, LED lights, a conveyor, a position encoder that measures the movement of the vehicle; a total station that measures fixed points of the measuring tunnel structure; a calibration chessboard and a calibration pattern; processing and storage means to store images taken by the video cameras, Computer-Aided-Design files of the vehicles and an edge recognition algorithm.

10 Claims, 5 Drawing Sheets

(51) Int. Cl.
- *G06T 7/00* (2017.01)
- *G06T 7/13* (2017.01)
- *G06T 7/20* (2017.01)
- *G06T 7/80* (2017.01)
- *H04N 17/00* (2006.01)
- *H04N 23/56* (2023.01)

(52) U.S. Cl.
CPC .............. *G06T 7/20* (2013.01); *G06T 7/80* (2017.01); *H04N 17/002* (2013.01); *H04N 23/56* (2023.01); *G06T 2200/04* (2013.01); *G06T 2207/10021* (2013.01); *G06T 2207/20212* (2013.01); *G06T 2207/30164* (2013.01); *G06T 2207/30244* (2013.01); *G06T 2207/30248* (2013.01)

(56) References Cited

U.S. PATENT DOCUMENTS

| | | |
|---|---|---|
| 9,311,706 B2 | 4/2016 | Natroshvili et al. |
| 2004/0221438 A1 | 11/2004 | Savoy et al. |
| 2019/0017847 A1 | 1/2019 | Han |

METHOD FOR MEASURING GAP AND FLUSH OF VEHICLE PARTS AND MEASURING TUNNEL

CROSS-REFERENCE TO RELATED APPLICATIONS

This application is the United States national phase of International Application No. PCT/ES2020/070488 filed Jul. 28, 2020, and claims priority to Spanish Patent Application No. P201930936 filed Oct. 23, 2019, the disclosures of which are hereby incorporated by reference in their entirety.

BACKGROUND OF THE DISCLOSURE

The object of the disclosure is a method for measuring the gap and flush of vehicle parts and a measuring tunnel provided with the means necessary to measure the gap and flush of vehicle parts.

The aim of the present disclosure is to, by means of the method, automate the process of measuring the gap and flush of different vehicle parts with respect to those surrounding them. For example, a vehicle door has a perimeter edge that has to be flush with the parts of the vehicle that surround the door, such as other doors, fenders, etc. Furthermore, the door has to have a specific gap within a very narrow margin so that the door opens and closes properly.

The technical field to which the present disclosure belongs is the field of measuring devices and methods applied to vehicle surfaces without making contact with the same.

DESCRIPTION OF RELATED ART

Currently, measuring systems known as "Gap & Flush" are automatic systems that often use robots with an integrated 3D sensor to perform the measurements (mainly on the final assembly). There are systems with fixed sensors, but these lack precision. There are also manual systems, wherein an operator with a portable device positions the meter over the points of the vehicle body to be measured, moving the meter in an oscillatory way to measure flush.

Systems that require operators are slow, since a single operator must move from one side of the vehicle to the other and, furthermore, positioning the measuring device on the vehicle may affect the vehicle's paint.

With regard to measuring systems based on robots, these systems have a number of drawbacks such as: they are expensive to install due to the high cost of the robots, the security, etc.; they are difficult to configure for users who are not experts in robots, as is usually the case for operators who perform the final assembly; they have a high maintenance cost; they are not enough adaptable to changes, since when adding or eliminating new points the robots must be reprogrammed; the number of sections to be measured is limited, in other words, there is a maximum number of possible sections since there is a strong dependence on the speed of the robots, which have a physical limit.

It would therefore be desirable to find a completely automated solution to the problem of calculating the gap and flush of the parts that make up a vehicle.

SUMMARY OF THE DISCLOSURE

The present disclosure discloses a method for measuring the gap and flush of vehicle parts and a measuring tunnel for measuring the gap and flush in vehicle parts.

In a first aspect of the disclosure, the measuring tunnel for measuring the gap and flush of vehicle parts is disclosed. The measuring tunnel comprises: video cameras to take images of a vehicle; a conveyor that linearly moves the vehicle and longitudinally passes through the measuring tunnel; a position encoder that measures the movement of the vehicle; a total station that measures fixed points of the measuring tunnel structure with precision and in 3D; a calibration chessboard on which a calibration pattern is situated; at least two lights synchronized with the video cameras; and processing and storage means that store at least the images taken by the video cameras, Computer-Aided-Design—CAD-files of the vehicles and an edge recognition algorithm. Furthermore, the processing and storage means are connected to the lights, to the video cameras, to the conveyor and to the position encoder. Lastly, the processing and storage means are adapted to execute the steps of the method for measuring the gap and flush of vehicle parts that will be defined in the second aspect of the disclosure.

It must be noted that the position encoder is a pulse generator which connects to the shaft of a motor that moves the conveyor and generates pulses while the motor is rotating. In the present disclosure, the position encoder is used to measure the advancement of the vehicle throughout the transportation thereof, since the pulses convert to measurements of length.

In an embodiment of the measuring tunnel, the calibration pattern is formed by squares arranged in a staggered formation. Additionally, the calibration pattern comprises a data matrix code and a fiducial marker. The data matrix code and the fiducial marker contain information relating to the calibration pattern, such as the number of rows and columns, the location of the center square, the size of the squares, the colors of the squares, etc. Preferably, the squares are black and white because they have a greater contrast when determining their connecting points.

In another embodiment of the measuring tunnel, the measuring tunnel additionally comprises an inverted U-shaped support structure and a front support structure to support the lights and the cameras for viewing inside the measuring tunnel. These supports for the lights and video cameras have the advantage of situating the video cameras in such a way that they can completely scan the vehicle that is inside the measuring tunnel.

In another embodiment of the measuring tunnel, the lights have a minimum length of 400 mm. Additionally, or optionally, the lights have LED technology.

In a second aspect of the disclosure, the method for measuring the gap and flush of vehicle parts associated with the measuring tunnel of the first aspect of the disclosure is disclosed. The method for measuring the gap and flush of vehicle parts comprises the following steps:
  calibrating the video cameras comprised in the measuring tunnel by calculating the intrinsic parameters and extrinsic parameters of the video cameras;
  building a common reference system -SCE- for the measuring tunnel and linking the video cameras to the common reference system -SCE-;
  calculating 3D coordinates by stereo vision of at least four reference points of the vehicle based on the common reference system -SCE- obtaining the X,Y,Z coordinates of each reference point;
  calculating the X,Y,Z coordinates of each reference point based on a vehicle reference system -SCV- from a Computer-Aided-Design—CAD-file with the three-dimensional vehicle measurements;

shooting light beams synchronized with the video cameras from at least two lights that reflect light off parts of the vehicle and fail to reflect light in a gap between the vehicle parts, such that the lack of light reflection is confined between edges that do reflect light;

taking at least two synchronized 2D images of the vehicle parts lacking a reflection by means of the video cameras, wherein an identifier -ID- of each synchronized 2D image is associated with the spatial position of the vehicle with respect to the measuring tunnel, and applying an edge recognition algorithm that calculates the X,Y coordinates of each edge as well as of the identifier -ID- based on the common reference system -SCE-;

combining the synchronized 2D images into 3D images wherein the edges in the 3D images have X,Y,Z coordinates linked to the common reference system -SCE-;

calculating the X,Y,Z coordinates of the edges of the 3D images linked to the vehicle reference system -SCV- using the equation:

$$SCV = \text{Inverse}(MR) \times SCE$$

wherein SCV is a matrix that defines the X,Y,Z coordinates linked to the vehicle reference system -SCV-; SCE is a matrix that defines the X,Y,Z coordinates linked to the common reference system -SCE-; and MR is the relationship matrix between both reference systems and which defines the translation, rotation and scale necessary to go from one reference system to another;

calculating a flush and gap of the vehicle parts as the gap distance between the edges on coordinates X,Y,Z linked to the vehicle reference system -SCV-.

An example of this, if the distance from the front door of a vehicle to the corresponding fender of the vehicle is to be measured, there is a "section" (line) determined by the last point of the door that reflects light when illuminated by lights, which will be an edge of the section, and by the last point of the fender that reflects light when illuminated by lights, which will be the other edge of the section. The part between the edges does not reflect light and represents the distance in three dimensions (gap and flush) between the vehicle parts (door and fender).

The calibration process of the video cameras described in the calibration step of the video cameras involves calculating the intrinsic and extrinsic parameters. To calculate the intrinsic parameters, the following sub-steps are carried out:

taking at least two images of the calibration chessboard that comprises at least the data matrix code and the fiducial marker;

decoding the data matrix code to obtain the size of the square, the number of rows and the number of columns of the calibration chessboard;

determining the center square of the calibration chessboard based on the data matrix code;

calculating all of the connections of the squares starting from the center square;

calculating the Optical Center, the focal distance, at least six parameters of Radial distortion (K1-K6) and at least two parameters of tangential distortion (P1, P2) based on the connections of the squares, the size of the optic comprised in the video cameras and the cell size of the video camera's CCD.

Furthermore, to calculate the extrinsic parameters, the method for measuring the gap and flush of a vehicle comprises the following sub-steps:

situating the calibration chessboard inside the measuring tunnel in a position where it is visible by at least one video camera;

taking a measurement of the calibration chessboard by means of the total station, by:

measuring four fixed points on the measuring tunnel structure by means of the total station;

iteratively stationing the total station, obtaining the common reference system -SCE- with respect to a vehicle conveyor that conveys vehicles through the inside of the inspection tunnel;

using the total station in the common reference system -SCE- to measure at least twelve auxiliary points located on the calibration chessboard;

calculating the relationship between the common reference system -SCE- and the calibration chessboard using estimation and transformation of rigid bodies;

saving at least one image of the calibration chessboard by each video camera;

calculating a local coordinates system of each video camera and calculating the transformation of the local coordinates system to the common reference system -SCE-.

Once the video cameras are calibrated and the common reference system -SCE- is built, linking the video cameras to the common reference system -SCE-, the next step is calculating the 3D coordinates by stereo vision of the four reference points of a vehicle based on the common reference system -SCE-, obtaining the X,Y,Z coordinates of each reference point. To calculate the 3D coordinates by stereo vision of the four reference points of a vehicle, the following steps are carried out:

choosing two video cameras per side of the vehicle that have visual access to the four reference points that will be measured;

choosing the reference points to be calculated on the vehicle considering the synchronized movement of the vehicle on the conveyor with respect to the measuring tunnel.

Optionally, and in addition to the two previous steps, recognition patterns can be created to recognize subsequent similar vehicles by means of a vector search algorithm.

DETAILED DESCRIPTION

Figure 1:
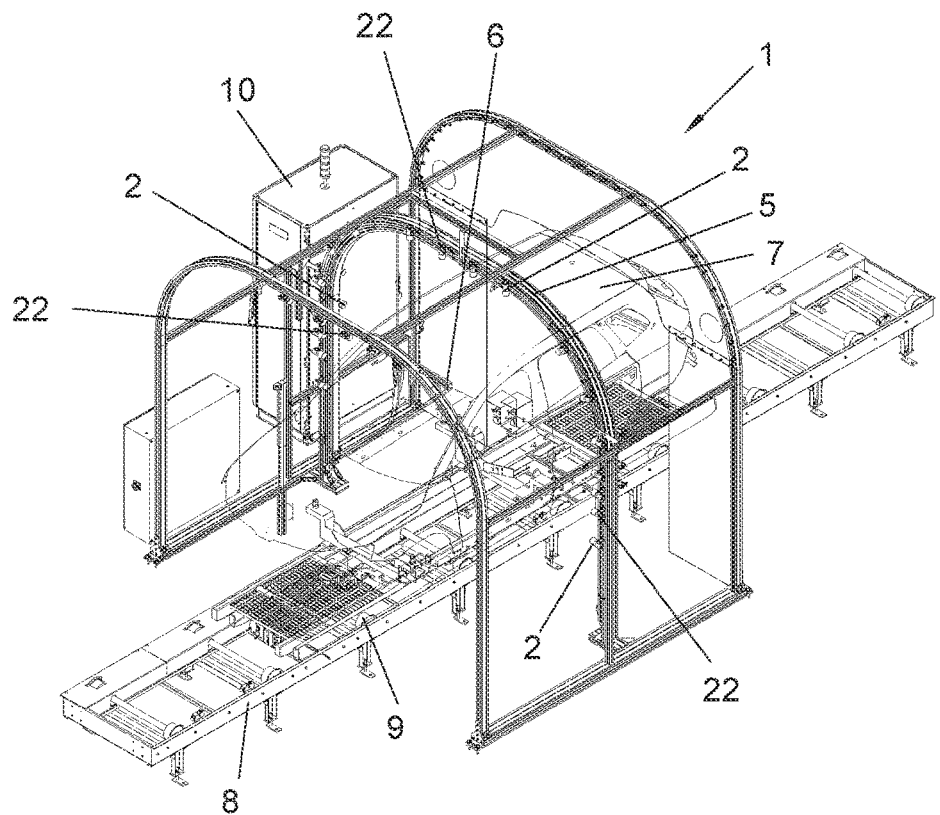
FIG. 1 shows the measuring tunnel for measuring the gap and flush of vehicle parts and a vehicle inside the same.

FIG. 1 shows the measuring tunnel 1 of the present disclosure for measuring the gap and flush between any two points of a vehicle body. FIG. 1 shows the measuring tunnel 1 and, inside the same, the vehicle frame 7 on the conveyor 8. The conveyor 8 moves the vehicle 7 through the inside of the measuring tunnel 1. The measuring tunnel 1 is mainly made up of the video cameras 2 and, near them, LED lights 22, all of which (2,22) are supported by the inverted U-shaped support structure 5 and also by the front support structure 6. Additionally, the measuring tunnel 1 has the vehicle conveyor 8, the position encoder 9 and the processing and storage means 10. The processing and storage means 10 are processors and memories configured to execute the steps of the method described in the present disclosure as well as to interconnect with the rest of the elements that make up the measuring tunnel. Furthermore, the position encoder 9 allows the measuring tunnel 1 to know the position of the vehicle at all times. This allows synchronized images to be taken, as will be described below.

Before beginning the process of measuring the distance in 3D between vehicle parts, it is necessary to calibrate the video cameras 2. The calibration of the video cameras 2 consists of calculating the intrinsic and extrinsic parameters of the video cameras.

Figure 2:
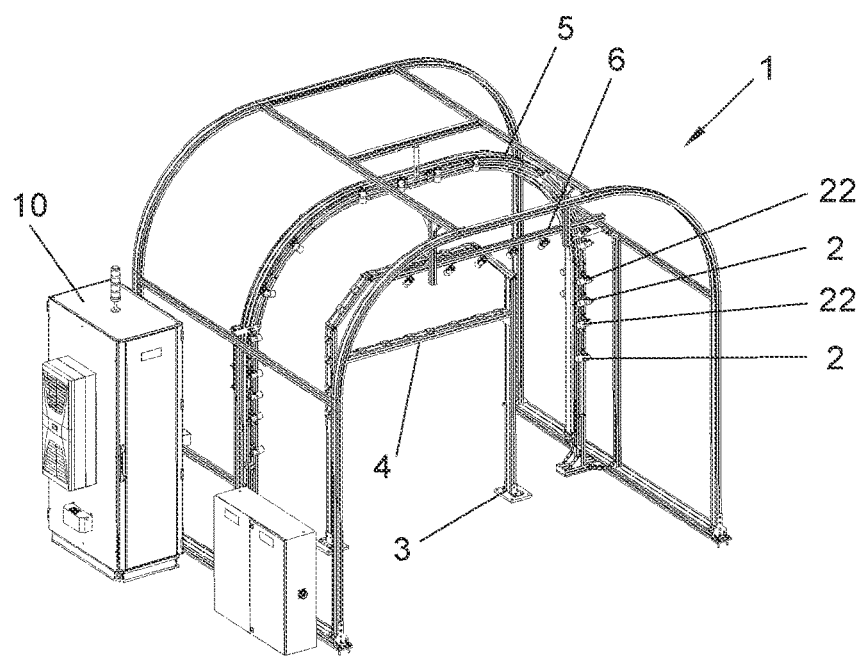
FIG. 2 shows the measuring tunnel of the present disclosure in which the calibration chessboard is situated on the bottom.
Figure 3:
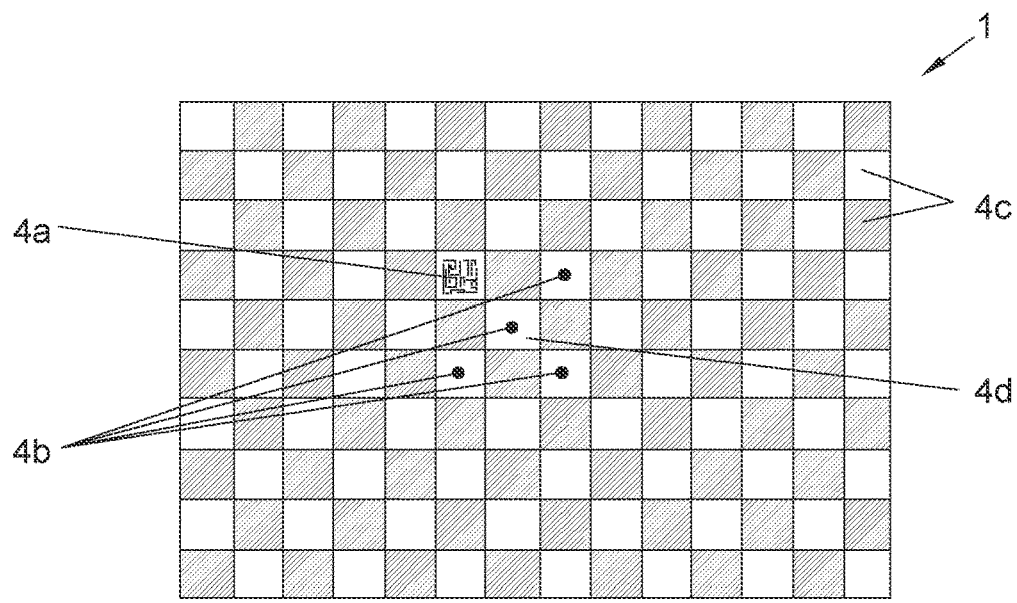
FIG. 3 shows the calibration pattern that of the calibration chessboard.

To calculate the intrinsic parameters, a calibration chessboard 3 is placed inside the measuring tunnel 1, as shown in FIG. 2. The calibration pattern 4 is situated on the surface of the calibration chessboard 3, the form of which is shown in FIG. 3. The calibration pattern 4 is made up of black and white squares 4c that alternate in a staggered formation, similar to a chessboard. The calibration pattern 4 comprises the data matrix code 4a and the fiducial marker 4b arranged on different white squares. The processing and storage means 10 carry out the following steps to calculate the intrinsic parameters: they take at least two images of the calibration chessboard 3 with the calibration pattern 4 by means of the video cameras 2; they decode the data matrix code 4a to obtain the size of the square 4c, the center square 4d, the number of rows and the number of columns of the calibration chessboard 3. With the previous information, the processing and storage means 10 calculate all of the connections of the squares based on the center square, and with the connections of the squares, the size of the optic comprised in the video cameras and the size of the CCD cell of the camera, they calculate the intrinsic parameters which are: the optical center, the focal distance, at least six Radial distortion parameters (K1-K6) and at least two tangential distortion parameters (P1, P2).

Figure 4:
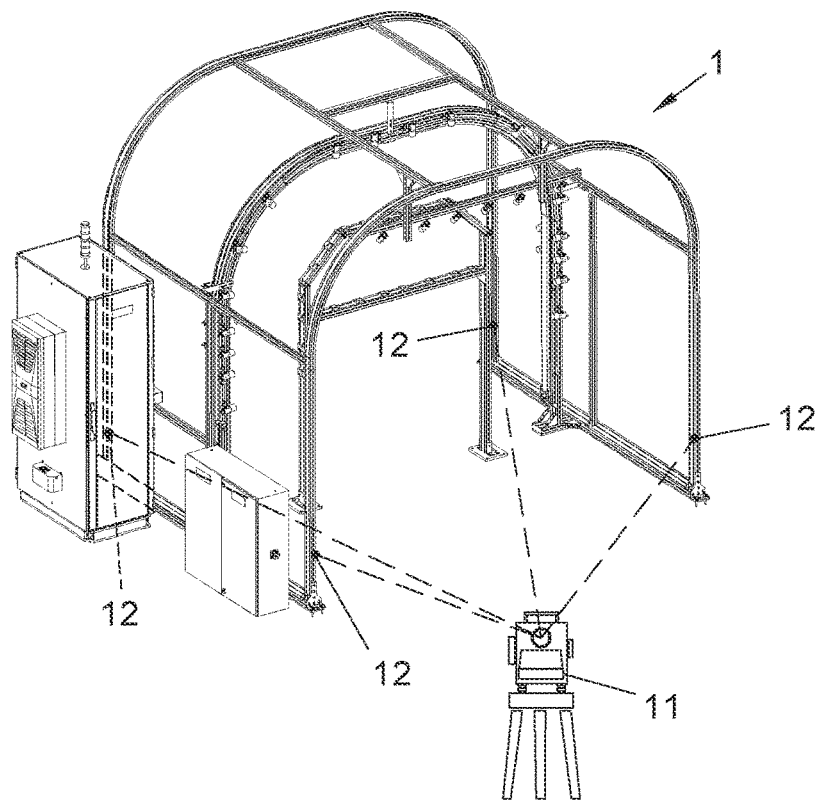
FIG. 4 shows the total station taking 3D coordinates of four fixed points of the measuring tunnel.

With respect to the extrinsic parameters, in addition to using the calibration chessboard 3, the total station 11 is used as shown in FIG. 4. First, the calibration chessboard 3 is situated inside the measuring tunnel 1 in a position where it is visible by at least one video camera 2. Then, a measurement is taken of the calibration chessboard 3 by means of the total station 11. This implies creating a common reference system -SCE- 15, for which iterative measurements of four points of the measuring tunnel structure 1 and twelve points located on the calibration chessboard 3 are taken by the total station 11. In other words, the same four points of the measuring tunnel 1 and twelve points located on the calibration chessboard 3 are measured from different positions of the total station 11 with respect to the measuring tunnel 1. The different positions are, preferably, the positions that a vehicle would move through on the conveyor 8. In other words, the relationship between the measurements taken of the four fixed points 12 of the measuring tunnel 1 and the twelve points located on the calibration chessboard 3 allows a common reference system -SCE- 15 to be created. Once the common reference system -SCE- 15 is defined, it is necessary to link each video camera 2 with respect to the common reference system -SCE- 15 so as to be able to later determine the 3D coordinates of one edge of a vehicle part. To do so, it is first necessary to calculate the relationship between the common reference system -SCE- and the calibration chessboard by transformation and estimation of rigid bodies. Then, at least one image of the calibration chessboard 3 taken by each video camera 2 is saved, the local coordinate system of each video camera 2 is calculated and, lastly, the transformation of the local coordinate system to the common reference system -SCE- is calculated.

Figure 5:
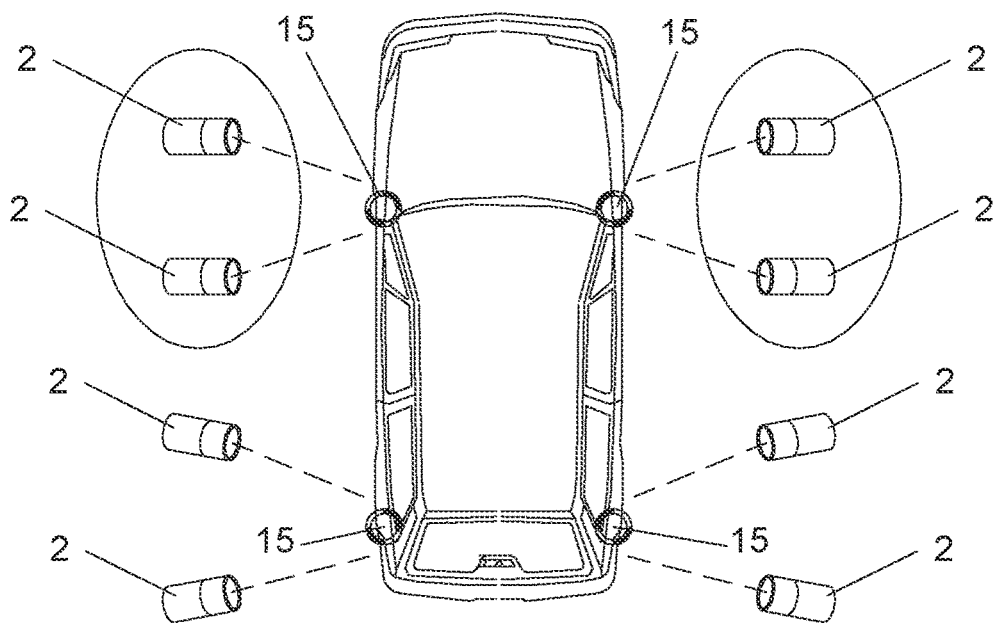
FIG. 5 shows the calculation of four reference points of the vehicle by the video cameras.
Figure 6:
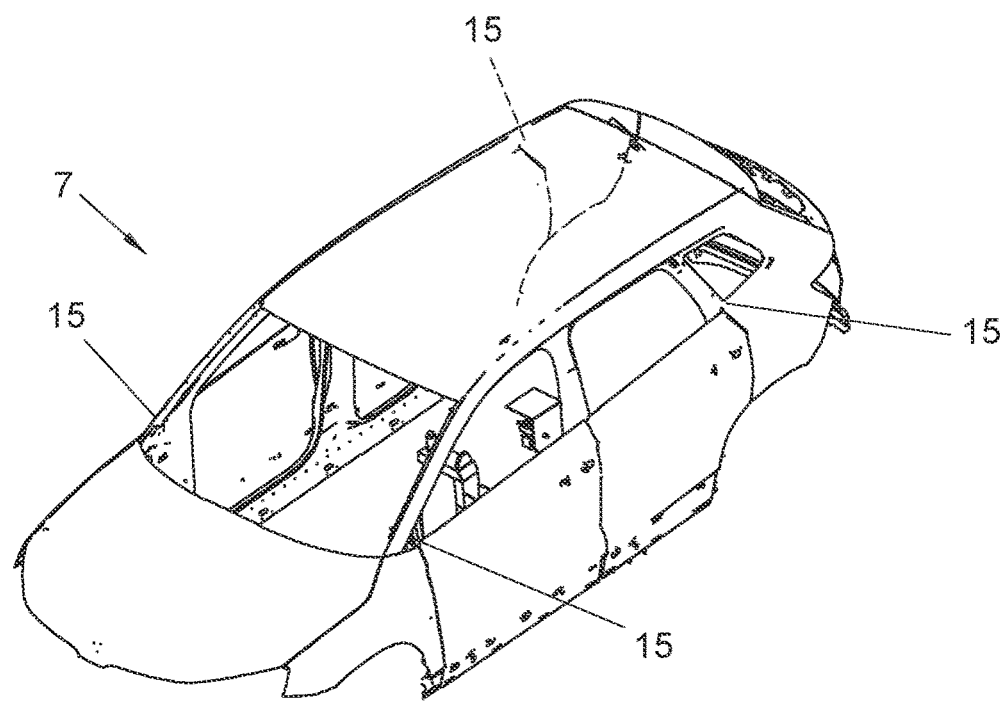
FIG. 6 shows a perspective showing the four reference points.

Once the video cameras 2 are calibrated and the common reference system -SCE- 16 is built, linking the video cameras to the common reference system -SCE- 16, the following step is applied, which consists of calculating the 3D coordinates by stereo vision of four reference points 15 of a vehicle based on the common reference system -SCE- thereby obtaining the X,Y,Z coordinates of each reference point as shown in FIGS. 5 and 6. As shown in FIG. 5, on each side of the vehicle 7, two video cameras 2 take images of the reference point 15 and obtain the 3D coordinates of the reference point 15 with respect to the common reference system -SCE- 16. Therefore, the 3D coordinates of two reference points 15 are obtained, one for each side of the vehicle. Simultaneously, or sequentially, the 3D coordinates of another two reference points 15, one on each side of the vehicle, are calculated. This can be performed simultaneously, if there are video cameras 2 that can take images of the other two reference points 15, or sequentially, by moving the vehicle 7 by means of the conveyor 8 until the two video cameras 2 can have access to the other two reference points 15. The 3D coordinates of the reference points 15 have a correction factor to eliminate movement, when performed sequentially, which is known by the position encoder 9 situated in the conveyor 8. To avoid having to repeat the steps described for FIGS. 5 and 6 for subsequent similar vehicles to be inspected in the measuring tunnel 1, the processing and storage means 10 can create recognition patterns through a contrast vector search algorithm.

Figure 7:
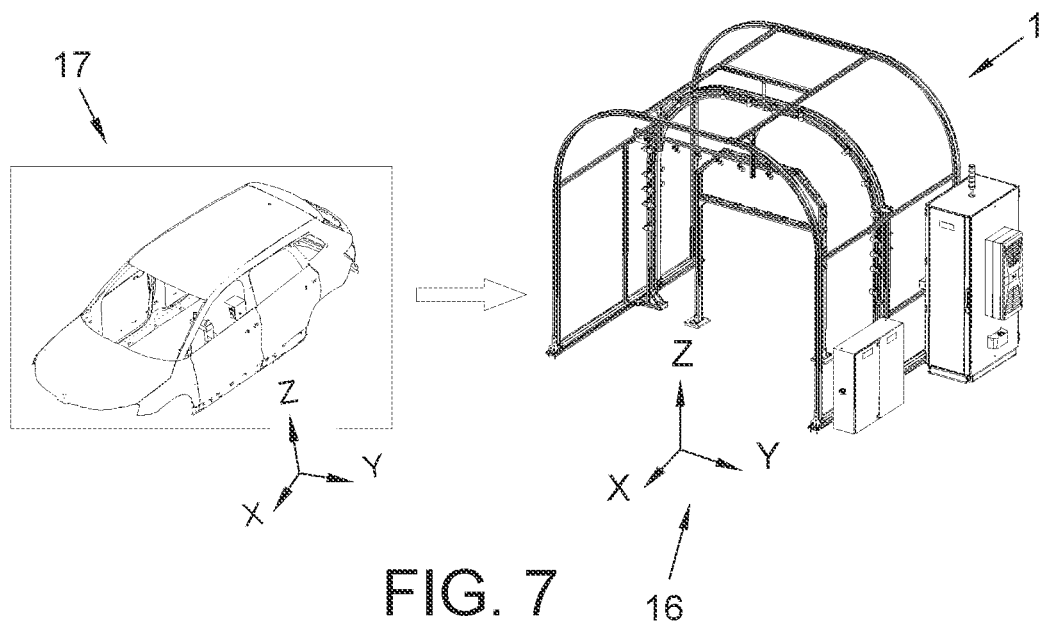
FIG. 7 shows the common reference system SCE and the vehicle reference system SCV.

Once the 3D coordinates of four reference points 16 of the vehicle 7 are calculated with respect to the common reference system -SCE- 16 it is possible to establish a correspondence between the 3D coordinates of the four reference points 15 of the vehicle with respect to the common reference system -SCE- 16 and the 3D coordinates of those same four reference points 15 of the vehicle with respect to the vehicle reference system -SCV- 17 (FIG. 7), locating the four reference points in a Computer-Aided-Design—CAD- file that contains the measurements/coordinates of the vehicle in 3D. In other words, correspondence is established between each one of the reference points 15 calculated by the video cameras and the same reference points 15 extracted from the CAD file.

Figure 8:
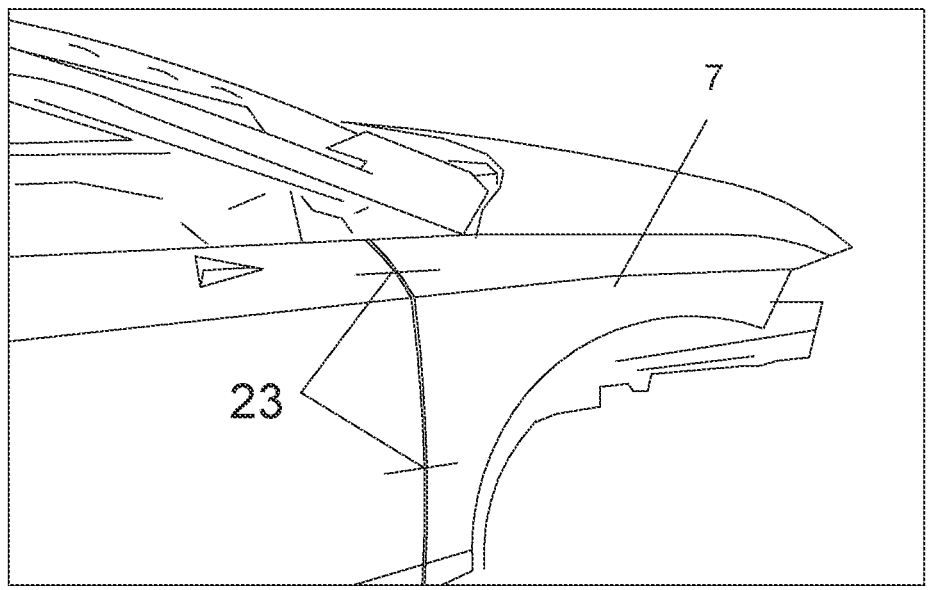
FIG. 8 shows a vehicle for which the gap and flush between two parts of the same are to be measured.
Figure 9:
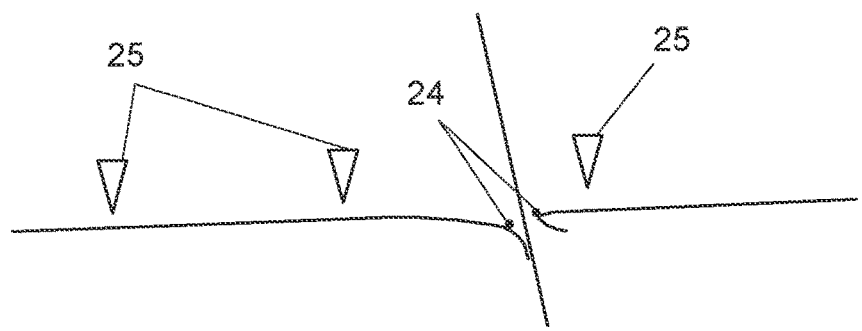
FIG. 9 shows a sweep of the surface of two parts of a vehicle and a discontinuity in said surface defined between two edges.

The vehicle 7 surface is then analyzed through a scan 25 (FIG. 9) of the surface to detect the gap zones (or sections) 23 that are to be measured (FIG. 8). Specifically, the method of the present disclosure calculates the 3D coordinates of the edges 24 (FIG. 9) of the discontinuity that is created between the different adjacent parts of the vehicle. To do so, light beams are shot by means of lights 22, which are synchronized with the video cameras 2. The light beams generate light reflection off the parts that make up the vehicle and darkness (the absence of light reflection—see detailed enlargement FIG. 10) in the gap (space between the edges 24 in FIGS. 9 and 10) between said vehicle parts.

Figure 10:
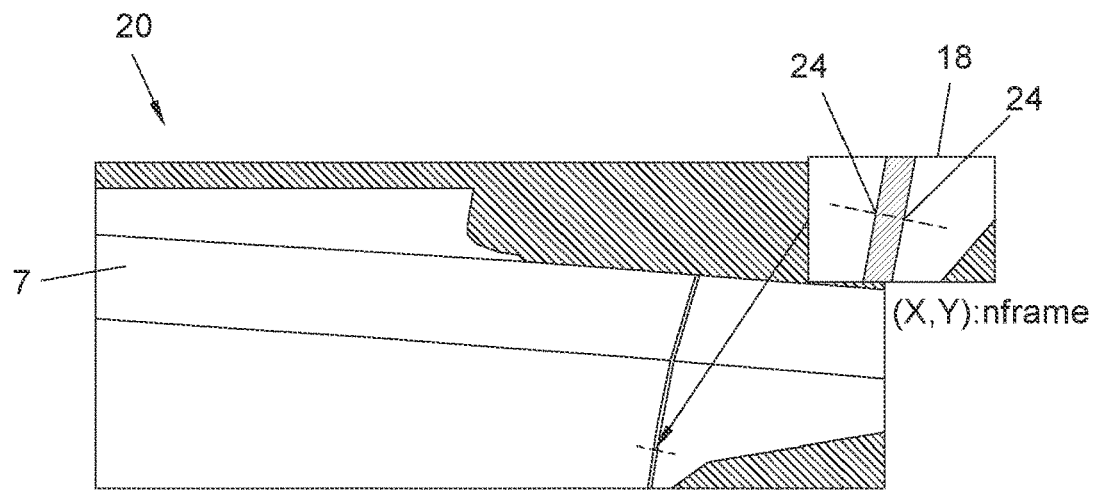
FIG. 10 shows a 2D image of a discontinuity between two parts of a vehicle and the position of the edges in 2D by means of X,Y coordinates of the edges.
Figure 11:
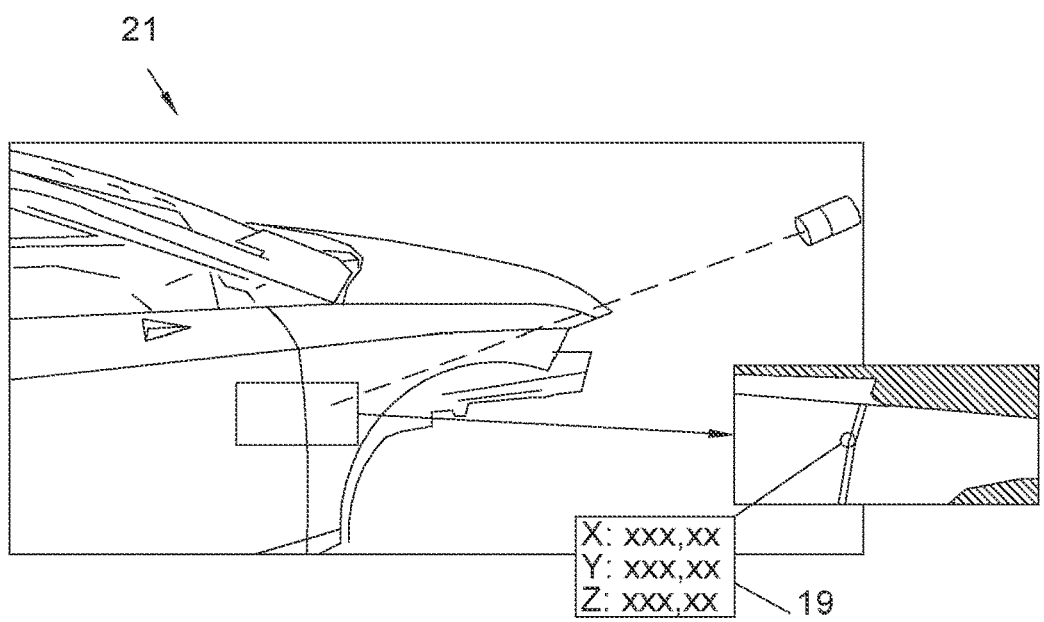
FIG. 11 shows a 3D image of a discontinuity between two parts of a vehicle and the position of the edges in 3D by means of X,Y,Z coordinates of the edges.

To do so, several synchronized 2D images 20 of the vehicle 7 are taken by the video cameras (FIG. 10). It is said that the 2D images are "synchronized" because for each "synchronized" image there is a direct relationship between the identifier -ID- of the image, the spatial position of the video camera and the spatial position of the vehicle, since the vehicle is on the conveyor 8, the spatial relationship of which with the measuring tunnel 1 is known by means of the position encoder 9. As is shown in FIG. 10, to each synchronized 2D image 20 an edge recognition algorithm is applied through which the processing and storage means can calculate the X,Y coordinates 18 of each edge 24 based on the common reference system -SCE-, associate it with the identifier -ID- and store it for further processing.

Once several synchronized 2D images 20 (at least two) of the edges 18 have been taken, the synchronized 2D images are combined with 3D images 21 to obtain 3D images wherein the edges in the 3D images have X,Y,Z coordinates 19 linked to the common reference system -SCE-. Since we are calculating the distance between two vehicle parts, meaning the distance between the edges 24 of the vehicle itself, a transformation of the X,Y,Z coordinates of the edges of the 3D images of the common reference system -SCE- to the vehicle reference system -SCV- is calculated by means of the equation:

$$SCV = \text{Inverse}(MR) \times SCE$$

wherein SCV is a matrix that defines the X,Y,Z coordinates linked to the vehicle reference system -SCV-; SCE is a matrix that defines the X,Y,Z coordinates linked to the common reference system -SCE-; MR is the relationship matrix which defines the translation, rotation and scale necessary to go from the SCV reference system to the SCE reference system. The 3D coordinates (X,Y,Z) of the edge 19 are thereby obtained on the paint of the vehicle 7 in a 3D image linked to the vehicle reference system -SCV-.

The invention claimed is:

1. A method for measuring the gap and flush of vehicle parts by means of a measuring tunnel, the method comprising the following steps:
   calibrating video cameras comprised in the measuring tunnel by calculating intrinsic parameters and extrinsic parameters of the video cameras;
   building a common reference system -SCE- for the measuring tunnel and linking the video cameras to the common reference system -SCE-;
   calculating 3D coordinates by stereo vision of at least four reference points of a vehicle based on the common reference system -SCE- obtaining the X,Y,Z coordinates of each reference point;
   calculating the X,Y,Z coordinates of each reference point based on a vehicle reference system -SCV- from a Computer-Aided-Design file -CAD- with the three-dimensional vehicle measures;
   shooting light beams synchronized with the video cameras from at least two lights that reflect light off parts of the vehicle and fail to reflect light in a gap between the vehicle parts, such that the lack of light reflection is confined between edges that do reflect light;
   taking at least two synchronized 2D images of the vehicle parts lacking a reflection by means of the video cameras, wherein an identifier -ID- of each synchronized 2D image is associated with the spatial position of the vehicle with respect to the measuring tunnel, and applying an edge recognition algorithm that calculates the X,Y coordinates of each edge as well as of the identifier -ID- based on the common reference system -SCE-;
   combining the synchronized 2D images into 3D images wherein the edges in the 3D images have X,Y,Z coordinates linked to the common reference system -SCE-;
   calculating the X,Y,Z coordinates of the edges of the 3D images linked to the vehicle reference system -SCV- using the equation:

$$SCV = \text{Inverse}(MR) \times SCE$$

wherein SCV is a matrix that defines the X,Y,Z coordinates linked to the vehicle reference system -SCV-; MR is the relationship matrix and SCE is a matrix that defines the X,Y,Z coordinates linked to the common reference system -SCE-;
   calculating a flush and a gap of the vehicle parts as the gap distance between the edges on coordinates X,Y,Z linked to the vehicle reference system -SCV-.

2. The method for measuring the gap and flush of vehicle parts by means of a measuring tunnel according to claim 1, wherein the step of calibrating the video cameras additionally comprises the following sub-steps for calculating the intrinsic parameters:
   taking at least two images of a calibration chessboard that comprises at least a data matrix code and a fiducial marker;
   decoding the data matrix code to obtain a size of the square, a number of rows and a number of columns of the calibration chessboard;
   determining a center square of the calibration chessboard based on the data matrix code;
   calculating all of the connections of the squares starting from the center square;
   calculating an Optical Center, a focal distance, at least six parameters of Radial distortion (K1-K6) and at least two parameters of tangential distortion (P1, P2) based on the connections of the squares, the size of the optic comprised in the video cameras and the cell size of the camera's CDD.

3. The method for measuring the gap and flush of vehicle parts by means of a measuring tunnel according to claim 1, wherein the step of calibrating the video cameras additionally comprises the following sub-steps for calculating the extrinsic parameters:
   situating a calibration chessboard inside the measuring tunnel in a position where it is visible by at least one video camera;
   taking a measurement of a calibration chessboard by means of a total station, by:
      measuring four fixed points on the measuring tunnel structure by means of the total station;
      iteratively stationing the total station obtaining a common reference system -SCE- with respect to a vehicle conveyor that conveys vehicles through the inside of the inspection tunnel;
      using the total station in the common reference system -SCE- to measure at least twelve auxiliary points located on the calibration chessboard;

calculating the relationship between the common reference system -SCE- and the calibration chessboard using estimation and transformation of rigid bodies;

saving at least one image of the calibration chessboard by each video camera;

calculating a local coordinates system of each video camera and calculating the transformation of the local coordinates system to the common reference system -SCE-.

4. The method for measuring the gap and flush of vehicle parts by means of a measuring tunnel according to claim 1, wherein the step of calculating 3D coordinates by stereo vision additionally comprises the following sub-steps:

choosing two video cameras per side of the vehicle that have visual access to the four reference points that will be measured;

choosing the reference points to calculate on the vehicle considering the synchronized movement of the vehicle on a conveyor with respect to the measuring tunnel;

creating recognition patterns to recognize subsequent similar vehicles by means of a contrast vector search algorithm.

5. A measuring tunnel for measuring the gap and flush of vehicle parts, wherein the measuring tunnel comprises:

video cameras for taking images of a vehicle;

a conveyor that moves the vehicle linearly and passes longitudinally through the measuring tunnel;

a position encoder that measures the vehicle movement;

a total station that measures fixed points of the measuring tunnel;

a calibration chessboard on which a calibration pattern is situated;

at least two lights synchronized with the video cameras;

processing and storage means that store at least images taken by the video cameras, Computer-Aided-Design—CAD-files of vehicles and an edge recognition algorithm; being connected to the lights, video cameras, conveyor and position encoder and wherein the processing and storage means are adapted to execute the steps of the method of claim 1.

6. The measuring tunnel for measuring the gap and flush of vehicle parts according to claim 5, wherein the calibration pattern is formed by squares arranged in a staggered formation; and wherein it additionally comprises a data matrix code and a fiducial marker.

7. The measuring tunnel for measuring the gap and flush of vehicle parts according to claim 5, wherein the measuring tunnel additionally comprises an inverted U-shaped support structure and a front support structure to support the vision cameras and the lights inside the measuring tunnel.

8. A measuring tunnel for measuring the gap and flush of vehicle parts, wherein the measuring tunnel comprises:

video cameras for taking images of a vehicle;

a conveyor that moves the vehicle linearly and passes longitudinally through the measuring tunnel;

a position encoder that measures the vehicle movement;

a total station that measures fixed points of the measuring tunnel;

a calibration chessboard on which a calibration pattern is situated;

at least two lights synchronized with the video cameras;

processing and storage means that store at least images taken by the video cameras, Computer-Aided-Design—CAD-files of vehicles and an edge recognition algorithm; being connected to the lights, video cameras, conveyor and position encoder; and wherein the processing and storage means are adapted to execute the steps of the method of claim 2.

9. A measuring tunnel for measuring the gap and flush of vehicle parts, wherein the measuring tunnel comprises:

video cameras for taking images of a vehicle;

a conveyor that moves the vehicle linearly and passes longitudinally through the measuring tunnel;

a position encoder that measures the vehicle movement;

a total station that measures fixed points of the measuring tunnel;

a calibration chessboard on which a calibration pattern is situated;

at least two lights synchronized with the video cameras;

processing and storage means that store at least images taken by the video cameras, Computer-Aided-Design—CAD-files of vehicles and an edge recognition algorithm; being connected to the lights, video cameras, conveyor and position encoder; and wherein the processing and storage means are adapted to execute the steps of the method of claim 3.

10. A measuring tunnel for measuring the gap and flush of vehicle parts, wherein the measuring tunnel comprises:

video cameras for taking images of a vehicle;

a conveyor that moves the vehicle linearly and passes longitudinally through the measuring tunnel;

a position encoder that measures the vehicle movement;

a total station that measures fixed points of the measuring tunnel;

a calibration chessboard on which a calibration pattern is situated;

at least two lights synchronized with the video cameras;

processing and storage means that store at least images taken by the video cameras, Computer-Aided-Design—CAD-files of vehicles and an edge recognition algorithm; being connected to the lights, video cameras, conveyor and position encoder; and wherein the processing and storage means are adapted to execute the steps of the method of claim 4.

* * * * *